United States Patent [19]

Venzke

[11] 4,174,773
[45] Nov. 20, 1979

[54] SORTATION CONVEYOR TIP-UP AND MOUNTING APPARATUS

[75] Inventor: Charles E. Venzke, New Berlin, Wis.

[73] Assignee: A-T-O Inc., Willoughby, Ohio

[21] Appl. No.: 817,055

[22] Filed: Jul. 19, 1977

[51] Int. Cl.[2] .............................................. B65G 47/38
[52] U.S. Cl. ................................................. 198/365
[58] Field of Search ....................... 198/365, 796, 802; 214/11 R, 62 R, 62 A

[56] References Cited

U.S. PATENT DOCUMENTS

| | | | |
|---|---|---|---|
| 3,034,665 | 5/1962 | Speaker | 214/11 R |
| 3,167,192 | 1/1965 | Harrison et al. | 214/11 R |
| 3,510,014 | 5/1970 | Speaker et al. | 198/796 |
| 3,865,226 | 2/1975 | Scata | 198/796 |

FOREIGN PATENT DOCUMENTS 1182570  6/1959  France ..................................... 198/365

Primary Examiner—Jeffrey V. Nase
Attorney, Agent, or Firm—Wood, Herron & Evans

[57] ABSTRACT

A tip-up and mounting apparatus in a sortation conveyor includes a support angle, upstanding mounting angles, mounting brackets, and a tray engaging roller mounted on crank arms pivoted to the mounting brackets. The mounting angles are disposed with their apices facing outwardly of the conveyor, thus providing a mounting surface at 45° to the conveyor's machine direction for the mounting bracket. The crank arms are pivoted to the mounting bracket, and this configuration provides an in and out component of motion to the rollers during their movement to and away from sortation tray engagement, thereby maintaining a short roller dwell time in tray interfering position. Adjustable construction of the components, together with a self-aligning actuating cylinder mounted within the mounting bracket reduces bulk and provides a highly tunable and smoothly operating tip-up apparatus.

20 Claims, 3 Drawing Figures

SORTATION CONVEYOR TIP-UP AND MOUNTING APPARATUS

This invention relates to sortation conveyors, and more particularly to apparatus for tipping the trays of the sortation conveyor to discharge articles thereon.

This invention is particularly useful in connection with sortation conveyors of the type described in U.S. Pat. No. 3,034,665 to Richard Speaker wherein loaded trays are drawn past receiving stations and the trays are selectively tipped to discharge an article thereon into a bin or chute in response to a control signal. FIGS. 3 and 9 of that patent disclose a solenoid actuated tipping apparatus in detail. From these, it will be appreciated that the tipping rollers are swung into and out of the path of the tray apparatus to engage same and cause tipping. More particularly, the drawings show that the rollers are not swung in a plane which parallels tray movement, but rather which intersects it, thus the rollers are in interfering relationship to the tray apparatus for only a relatively short distance, and resulting short time duration. This feature is particularly important where the trays are conveyed at a relative high speed and are close together. It is necessary to tip them positively, yet the tipping roller must be quickly withdrawn so as not to interfere with a succeeding tray which is not to be tipped at that station. Accordingly, the roller's tray actuating motion is up and into the path of the tray apparatus, minimizing the dwell time of the roller in interfering relation to the tray, as opposed to a roller withdrawal motion where the roller is dropped out of tray engagement but in a plane parallel to the direction of tray movement.

While the tipping apparatus of the aforesaid patent has thus been useful, the solenoid and its required mounting structure have proved expensive, heavy and bulky, and are not particularly easy to adjust to insure the appropriate final roller alignment.

Accordingly, it has been one objective of this invention to provide improved tip-up apparatus for use in sortation conveyors.

A further objective of the invention has been to provide improved tip-up apparatus for a sortation conveyor wherein the dwell time of the tip-up, in interfering relation to the conveyor, is maintained at a minimum.

A further objective of the invention has been to provide improved tip-up mounting and actuating apparatus.

A still further objective of the invention has been to provide an easily adjustable universal tip-up mounting apparatus.

To these ends, a preferred embodiment of the invention includes an elongated support plate adapted to fit beneath the sortation conveyor, at least one upstanding mounting angle on the support plate and having its apex facing outwardly from said conveyor, a channel-shaped mounting bracket mounted on said mounting angle, a pivotable roller support arm pivoted to an upper end of said channel, and an air cylinder connected at one end to said arm and at another end to said mounting bracket. Elongated slots in the mounting bracket permit adjustment of the bracket to provide accurate alignment of the roller arm and roller with respect to the conveyor, while the disposition of the mounting angle provides the appropriate angular relationship for the desired tip-up roller movement.

The air cylinder is mounted via a floating mount at a lower portion of the mounting bracket and thus is free to align itself with the roller arm. It also permits utilization of a relatively light mounting structure in contrast to the castings or other heavy supports required for the solenoid of the aforesaid patent.

In the preferred embodiment, a second upstanding mounting angle, bracket, roller arm, and roller are disposed in like manner on the opposite end of the support plate to provide a second tip-up for tilting a tray to the opposite direction, thus providing tray tipping to either side.

In use, the improved mounting apparatus is adaptable to different forms of tilt-tray sortation conveyors, the support plate simply being bolted or attached to the rail or other structure and the mounting angle and bracket extending upwardly into position for mounting the tip-up roller arm.

These and other advantages will become readily apparent from the following detailed description of a preferred embodiment of the invention and from the drawings in which.

Figure 1:
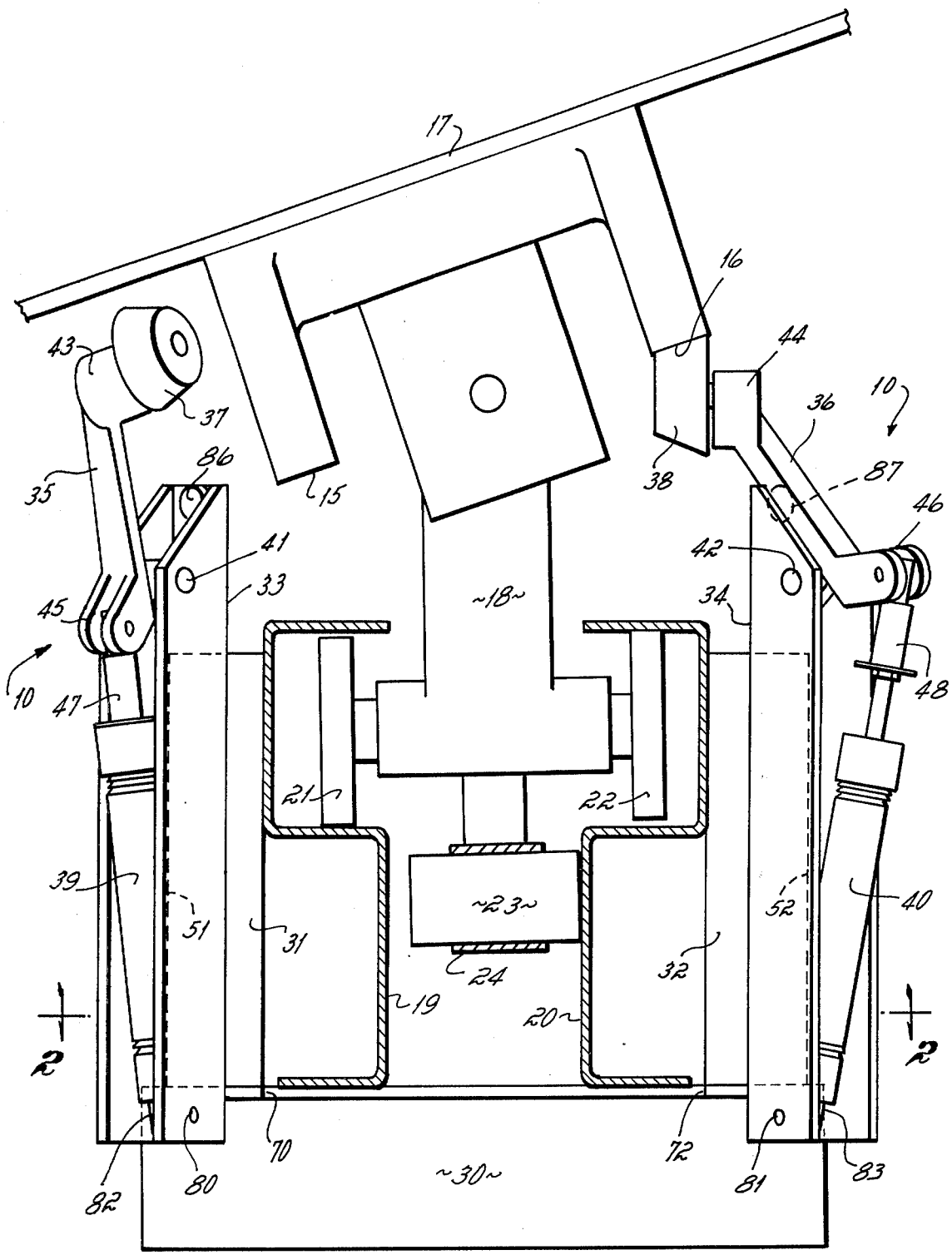
FIG. 1 is an elevational view showing an improved tip-up apparatus according to the invention.

Turning now to the drawings, there is shown in FIG. 1 thereof a tip-up apparatus 10 according to the invention. The tip-up apparatus 10 is particularly useful for engaging cam or lever surfaces 15 and 16 of an article carrying tray assembly 17 associated with a sortation conveyor of the type, for example, as shown in Speaker U.S. Pat. No. 3,034,665. Such a sortation conveyor generally includes a tilting tray assembly, such as that shown at 17 in FIG. 1 hereof, mounted on a carriage 18 disposed within a sortation conveyor track formed by rails 19 and 20. The carriage assembly 18 includes wheels, such as those at 21, 22 for supporting and positioning a carriage 18 within the track rails 19 and 20. A chain roller 23 of the tray conveyor chain 24 is positioned between rails 19 and 20 and serves as a retaining wheel during tray tipping, and as a guide wheel following rails 19 and 20. The tray assemblies 17 are normally in a horizontal article carrying position and are drawn past a plurality of receiving stations, comprising chutes or bins, for example, where the trays can be tilted or tipped to discharge the article thereon into the appropriate chute or bin for classification, shipping, storage or the like. The direction of movement of the tray carriage and assemblies 17, 18 are indicated by the arrow A in FIG. 2 of the drawings.

Figure 3:
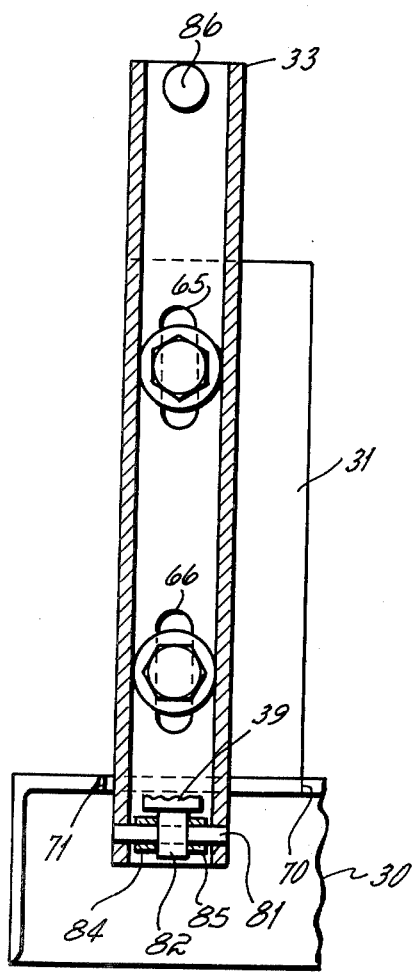
FIG. 3 is a cross-sectional view taken along lines 3—3 of FIG. 2 and omitting the upper portion of the air cylinder for clarity.

The tip-up apparatus 10, which is shown in the elevational view of FIG. 1, includes a support angle 30, upstanding mounting angles 31 and 32 and channel-shaped mounting brackets 33 and 34. Each channel-shaped mounting bracket, as clearly shown, includes a web and two opposed, parallel legs. As best shown in FIGS. 1 and 3, each of the channel-shaped mounting brackets 33 and 34 respectively mount and support a tray tilting roller mechanism. Each mechanism includes, respectively, pivoting crank arms 35 and 36, a tray engaging and actuating roller 37 and 38 and an air cylinder 39 and 40. The crank arms 35, 36 are pivoted to the respective channel-shaped mounting brackets 33, 34 via a pivot pin 41 or 42, respectively. Each crank arm has one end 43, 44, respectively, adapted to be connected to a respective roller 37, 38 and another end 45, 46, respectively, adapted to be connected to the respective air cylinder through a piston 47, 48. Thus, when the respective pistons, 47, 48 are actuated, the respective arms 35, 36 are pivoted at their respective pivot pins 41, 42 into operable position so that their respective rollers are in a position to engage the appropriate surfaces 15 or 16 of the tray assembly 17.

Figure 2:
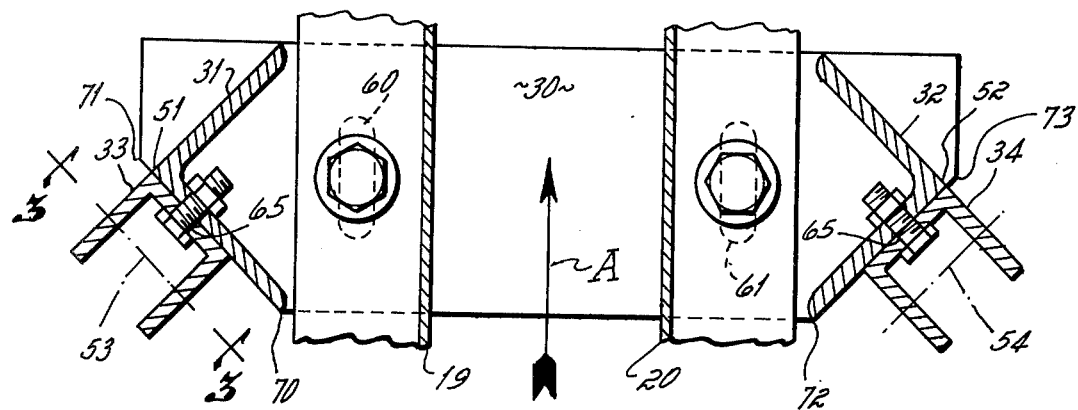
FIG. 2 is a cross-sectional view taken along lines 2—2 of FIG. 1.

The pivoting motion of the upper end of the crank arm, and the roller thereon, is generally in the direction of movement of the trays, or in other words, has a component of motion in the direction of arrow A (FIG. 2). Of course, in operation only one cylinder is actuated at a time so that a tray assembly 17 is only tilted to one side or the other of the conveyor at the specific station, the double tip-up assembly being provided for the purpose of selectively tilting the tray to either side of the conveyor upon an appropriate control signal to an air valve (not shown) for operating an appropriate cylinder 39 or 40.

In the construction of the tip-up apparatus 10, it should be noted that the mounting angles are mounted at their lower ends to the support angle and that the respective apices 51, 52 of the upstanding mounting angles 31 and 32, respectively, are pointed outwardly of the sortation conveyor, the angles having legs joined at 90° and opening inwardly toward the conveyor and each other as best seen in FIG. 2. When the channel-shaped mounting bracket 33 and 34 are consequently mounted on respective angles, the disposition of the angle leg on which they are mounted effectively places the axis of the pivot pins 41 and 42 at an angle of about 45° with respect to the direction of movement (arrow A) of the tray assemblies 17 along the rails 19 and 20. The axis of the pivot pins is shown in plan view at 53 and 54 in FIG. 2.

Accordingly, it should be appreciated that when the arms 35 and 36 are rotated by actuation of the cylinders 39 and 40, they move in a plane which is approximately at an angle of 45° with respect to the direction of the tray movement. They thus have a component of motion in the direction of arrow A, as well as a component of motion toward the conveyor and the tray assembly passing the receiving station.

It should also be appreciated that the rollers 37 and 38 are tapered rollers as shown in FIG. 1. When they are rotated into position by movement of their respective supporting arms 35, 36, the roller's surface is appropriately disposed for engaging the cooperating cam or lever surface 15 or 16, as the case may be, of the tray assembly 17. Thus, it should be further appreciated that the movement of the rollers 37 and 38 is not in a plane which parallels that in which the surfaces 15 and 16 are generally conveyed as the tray assembly moves along the conveyor. Rather, the plane of operation of the rollers 37 and 38 is an intersecting plane.

Accordingly, when the pivot arms 35, 36 are actuated into and out of engaging relationship with a tray assembly 17, it will be appreciated that the dwell time of the rollers 37 and 38 in interfering relationship with the surfaces 15 and 16 is very short, and this permits close spacing of the tray assemblies 17, as well as higher speeds, in contrast to those systems wherein the rollers are simply pivoted in a plane which parallels the direction of tray movement. Thus, the movement of the rollers 37 and 38 is both up and into the path of the surfaces 15 and 16, for engagement, or down and out of the same path for disengaging movement.

In order to provide easy adjustment of the tip-up apparatus 10 with respect to the sortation conveyor, the rails 19 and 20, and more particularly the tray assemblies 17, the tip-up apparatus 10 is provided with a number of adjustment features. For example, the horizontal leg of the support angle 30 is provided with slots 60 and 61 which correspond with bolt holes in the rails 19 and 20. Thus, when the tip-up apparatus is assembled to a conveyor, it is only necessary to bolt the support angle 30 to the bottom rails of the sortation conveyor. As best shown in FIG. 2, the slots 60 and 61 provide longitudinal, horizontal adjustment of the support angle and thus the tip-up apparatus in or opposite to the direction of movement (arrow A) of the trays.

In order to appropriately adjust the vertical height of the roller engagement position with the tray assemblies, each of the channel-shaped mounting brackets is provided with slots 65 and 66 to permit them to be raised or lowered with respect to the mounting angle 30.

As shown in the figures, the support angle 30 is relieved at each end thereof to accommodate the vertical movement of the channels 33 and 34 as they are adjusted via their respective slots 65 and 66. Thus, as best seen in FIGS. 2 and 3, the upper horizontal leg of support angle 30 is tapered from a point 70 out to the edge 71 of the support angle. Likewise, the upper horizontal leg of the support angle 30 is tapered on the opposite side from a point 72 out to the edge 73 of the support angle 30 to accommodate any vertical adjustment of the channel 34.

Each of the cylinders 39 and 40 are mounted within the channels so as to be relatively self-aligning with respect to the arms 35, 36 respectively. This self-alignment is accomplished by mounting the lower end of the cylinder within the mounting bracket and on respective pins such as those shown at 80 and 81 in FIG. 1. The mounting structure of the lower end of the cylinder is best seen in FIG. 3 wherein the lower end 82 of the cylinder 39 is shown in detail. The lower end 83 of the cylinder 40 is mounted in the channel 34 in the same manner. The lower end of each cylinder comprises a small extension having a bore through which the respective pin 80, 81 is mounted. The pins 80 and 81 are secured to the channel, but the lower ends 82 and 83 of the cylinders are free to slide back and forth across the pins, within the limitations provided by the respective spacer sleeves 84 and 85 on each pin. Thus, as the cylinder is operated to engage and disengage the respective roller with the tray assembly 17, the lower end of the cylinder is free to self-align itself with its respective crank arm 45 or 46, there being enough space left by the spacer sleeves 84, 85 to permit such self-alignment.

Of course, it will be appreciated that the cylinder is connected to an appropriate air cylinder operated valve (not shown) which in turn is actuated by a control signal from the sortation conveyor to thus actuate the cylinder to operate the respective crank arm 35, 36 and thus the respective roller 37, 38 in order to tilt the tray assembly 17 to a predetermined side of the conveyor track for discharge of the article on the tray. It should also be appreciated that each of the tip-up assemblies 10 are located along the sortation conveyor at a point where a selective discharge to one side or the other of the conveyor is desired at a receiving station. Finally, it should be noted that each of the channels is provided with a bumper 86, 87, respectively, to provide a stop for the respective arm 35, 36 when the arms are actuated to move the rollers 37, 38, respectively, into tray engaging position.

Accordingly, it will be appreciated that the invention described herein provides significant advantages and improvements over prior tip-up apparatus such as that shown in the previously cited Speaker U.S. Pat. No. 3,034,665. The combination of the upstanding mounting angle with the channel-shaped bracket provides initial angular disposition for the roller arm and provides for each vertical adjustment of the roller position which is important for the appropriate tray tilting. The utilization of the air cylinder provides a floating structure which is self-aligning during its operation and the utilization of the air cylinder, in combination with the structure of the mounting angle and the channel bracket, eliminate the need for heavy solenoids and support castings as previously utilized. Thus, the invention provides for complete vertical adjustment as well as horizontal adjustment to provide a highly tunable tip-up apparatus for utilization in a sortation conveyor, while at the same time maintaining the quick up and in—down and out, motion of the tray engaging rollers 37, 38 without the cost of the heavy support castings as previously used. Finally, it should be noted that the utilization of a simple structural angle, such as 31 and 32, and the disposition of that angle with the legs directed inwardly toward the sortation conveyor track and the respective apices of the angles directed outwardly, provide a very economical mounting structure for positioning the tip-up roller arms at the appropriate angle with respect to the direction of the tray movement.

These and other advantages and modifications will become readily apparent to those of ordinary skill in the art, without departing from the scope of this invention, and the applicant intends to be bound only by the claims appended hereto.

I claim:

1. In a sortation conveyor of the type having a plurality of tiltable tray assemblies and an extended track along which such assemblies are conveyed, improved tip-up apparatus for engaging and tilting said tray assemblies at preselected locations along said track, said improved tip-up apparatus comprising:
    an elongated support angle mounted beneath said track and having a horizontal leg attached thereto, said support angle extending outwardly of said track;
    at least one upstanding mounting angle having a lower end mounted on an end of said support angle and said mounting angle extending upwardly alongside said track;
    said mounting angle having two legs and an apex pointing away from said track such that said legs open toward said track and form approximate 45° angles with the direction of extension of said track;
    a U-shaped channel mounting bracket mounted on one leg of said mounting angle, said bracket including a web and two opposed legs, said web being mounted on said one leg of said mounting angle;
    a crank arm pivotally mounted on said mounting bracket;
    a roller on one end of said crank arm; and
    means for pivoting said crank arm to move said roller into interfering position with said tray assemblies to cause a selected tray to tilt toward an opposite side of said track, said crank arm pivoting in a plane at an angle with respect to the direction of conveyance of said tray assemblies,
    said pivoting means having an end mounted to said mounting bracket.

2. Apparatus as in claim 1 wherein said support angle is adjustably mounted to said track and wherein said mounting bracket is adjustably mounted to said mounting angle.

3. Apparatus as in claim 2 wherein said support angle is adjustable in a horizontal direction and said mounting bracket is adjustable in a vertical direction.

4. Apparatus as in claim 1 including at least two mounting angles, one mounted on each end of said elongated support angle, adjacent respective sides of said track.

5. Apparatus as in claim 1 wherein said pivoting means includes an air cylinder having one lower end connected to said mounting bracket and an operative end connected to said crank arm,
    a lower end of said air cylinder being mounted on a pin in said mounting bracket and being free to slide on said pin within said bracket.

6. Apparatus as in claim 1 wherein said mounting bracket extends below said horizontal leg of said support angle, said support angle being relieved to permit such extension.

7. Apparatus as in claim 1 further including a pivot pin supporting said crank arm, said pivot pin mounted at each end in opposed legs of said mounting bracket, having a horizontal axis at a 45° angle with respect to the direction of extension of said track and being parallel with said one leg of said mounting angle.

8. Apparatus as in claim 7 wherein said pivoting means comprises an air cylinder having a lower end mounted within said channel-shaped mounting bracket.

9. Tip-up apparatus for a sortation conveyor including:
    an elongated support means adapted for connection to a sortation conveyor;
    at least one upstanding angle means having a lower end mounted on said support means, said angle means having an apex directed outwardly of a sortation conveyor when assembled thereto, and legs opening toward said conveyor;
    a U-shaped channel mounting bracket having two opposed legs and a web mounted on one of said angle means legs;
    a crank arm pivoted to said bracket;
    an actuating roller mounted on one end of said crank arm; and
    actuating means connected to said crank arm for pivoting said crank arm and said roller into operative position with respect to said sortation conveyor, said crank arm pivoting in a plane at an angle to said sortation conveyor when assembled thereto,
    said actuating means having an end mounted to said mounting bracket.

10. Apparatus as in claim 9 wherein said upstanding angle is mounted on one end of said support means and has two legs opening toward an opposite end thereof.

11. Apparatus as in claim 9 including one upstanding angle mounted on each respective end of said support means, said upstanding angles including legs disposed in a position opening toward each other, the apex of each angle pointed away from the other.

12. Apparatus as in claim 11 including a mounting bracket mounted on a leg of each mounting angle, each bracket being channel-shaped with two parallel legs and a web and being vertically adjustable with respect to their respective mounting angles.

13. Apparatus as in claim 12 including a crank arm pivoted on each mounting bracket between two parallel legs of said channel-shaped mounting brackets.

14. Apparatus as in claim 13 wherein said crank arm pivots in a plane parallel to said parallel legs and said parallel legs are perpendicular to said angle leg.

15. Apparatus as in claim 14 wherein said actuating means comprises cylinders having lower ends mounted within respective mounting brackets and upper ends operatively connected to respective crank arms.

16. In a sortation conveyor of the type having a plurality of tiltable tray assemblies and an extended track along which such assemblies are conveyed, improved tip-up apparatus for engaging and tilting said tray assemblies at preselected locations along said track, said improved tip-up apparatus comprising:
   an elongated support angle mounted beneath said track and having a horizontal leg attached thereto, said support angle extending outwardly of said track;
   at least one upstanding mounting angle having a lower end mounted on an end of said support angle and said mounting angle extending upwardly alongside said track;
   said mounting angle having two legs and an apex pointing away from said track such that said legs open toward said track and form approximate 45° angles with the direction of extension of said track;
   a U-shaped channel mounting bracket mounted on one leg of said mounting angle, said bracket including a web and two opposed, parallel legs, said web being mounted on said one leg of said mounting angle;
   a mounting pin mounted in said parallel bracket legs, said pin being parallel to said web and said one leg of said mounting angle and having an axis disposed at about 45° to the direction of extension of said track;
   a crank arm pivotally mounted on said pin in said mounting bracket;
   a roller on one end of said crank arm; and
   means for pivoting said crank arm to move said roller into interfering position with said tray assemblies to cause a selected tray to tilt toward an opposite side of said track, said crank arm pivoting in a plane at an angle with respect to the direction of conveyance of said tray assemblies,
   said pivoting means having an end mounted to said mounting bracket.

17. Apparatus as in claim 16 including slot means in said horizontal leg for adjustable mounting of said support angle to said track in a horizontal plane.

18. Apparatus as in claim 16 including slot means in said channel web for adjustable mounting of said mounting bracket to said mounting angle.

19. Apparatus as in claim 18 wherein said support angle is relieved along a line coincidental with said one leg of said mounting angle to permit vertical adjustment of said mounting bracket with respect thereto and without interfering therewith.

20. In a sortation conveyor of the type having a plurality of tiltable tray assemblies and an extended track along which such assemblies are conveyed, tip-up apparatus for engaging and tilting said tray assemblies at preselected locations along said track, said tip-up apparatus comprising:
   an elongated support angle mounted beneath said track and having a horizontal leg attached thereto, said support angle extending outwardly of said track;
   at least one upstanding mounting angle having a lower end mounted on an end of said support angle and said mounting angle extending upwardly alongside said track;
   said mounting angle having two legs and an apex pointing away from said track such that said legs open toward said track and form approximate 45° angles with the direction of extension of said track;
   a mounting bracket mounted on one leg of said mounting angle;
   a crank arm pivotally mounted on said mounting bracket;
   a roller on one end of said crank arm; and
   means for pivoting said crank arm to move said roller into interfering position with said tray assemblies to cause a selected tray to tilt toward an opposite side of said track,
   said pivoting means having an end mounted to said mounting bracket.

* * * * *